United States Patent
Lin et al.

(10) Patent No.: US 11,795,376 B2
(45) Date of Patent: Oct. 24, 2023

(54) VISCOSIFYING FRICTION REDUCERS

(71) Applicant: ENERGY SOLUTIONS (US) LLC, Princeton, NJ (US)

(72) Inventors: Genyao Lin, The Woodlands, TX (US); Louis Villafane, Baltimore, MD (US); Kailas Sawant, Mars, PA (US); Shih-Ruey Chen, Studio City, CA (US); Kevin Frederick, Evans City, PA (US)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 0 days.

(21) Appl. No.: 17/007,284

(22) Filed: Aug. 31, 2020

(65) Prior Publication Data
US 2020/0399529 A1 Dec. 24, 2020

Related U.S. Application Data

(63) Continuation of application No. 15/050,824, filed on Feb. 23, 2016, now abandoned.

(60) Provisional application No. 62/126,170, filed on Feb. 27, 2015.

(51) Int. Cl.
| | |
|---|---|
| *C09K 8/64* | (2006.01) |
| *C09K 8/68* | (2006.01) |
| *C09K 8/36* | (2006.01) |
| *C09K 8/72* | (2006.01) |
| *C09K 8/82* | (2006.01) |
| *E21B 43/26* | (2006.01) |

(52) U.S. Cl.
CPC ............ *C09K 8/64* (2013.01); *C09K 8/36* (2013.01); *C09K 8/68* (2013.01); *C09K 8/725* (2013.01); *C09K 8/82* (2013.01); *C09K 2208/14* (2013.01); *C09K 2208/28* (2013.01); *E21B 43/26* (2013.01)

(58) Field of Classification Search
None
See application file for complete search history.

(56) References Cited

U.S. PATENT DOCUMENTS

| | | |
|---|---|---|
| 3,067,987 A | 12/1962 | Ballou et al. |
| 3,284,393 A | 11/1966 | Vanderhoff et al. |
| 4,024,097 A | 5/1977 | Slovinsky et al. |
| 4,051,065 A | 9/1977 | Venema |
| 4,059,552 A | 11/1977 | Zweigle et al. |
| 4,419,344 A | 12/1983 | Strasilla et al. |
| 4,522,502 A | 6/1985 | Brazelton |
| 4,524,175 A | 6/1985 | Stanley, Jr. |
| 4,642,222 A | 2/1987 | Brazelton |
| 4,672,090 A | 6/1987 | Chan |
| 4,747,691 A | 5/1988 | Hoffland |
| 4,772,659 A | 9/1988 | Chan |
| 4,814,096 A | 3/1989 | Evani |
| 5,292,800 A | 3/1994 | Moench et al. |
| 5,470,150 A | 11/1995 | Pardikes |
| 5,763,530 A * | 6/1998 | Chen .............. C02F 1/54 524/211 |
| 6,825,301 B1 | 11/2004 | Cerf et al. |
| 7,311,146 B1 | 12/2007 | Hanes, Jr. et al. |
| 8,640,774 B1 * | 2/2014 | Frederick ........ C09K 8/36 166/305.1 |
| 2005/0067194 A1 | 3/2005 | Pena et al. |
| 2014/0144643 A1 | 5/2014 | Frederick et al. |

FOREIGN PATENT DOCUMENTS

| | | |
|---|---|---|
| EP | 0399767 A2 | 11/1990 |
| WO | 2014164078 A1 | 10/2014 |

* cited by examiner

*Primary Examiner* — Jeffrey D Washville
(74) *Attorney, Agent, or Firm* — Osha Bergman Watanabe & Burton LLP

(57) ABSTRACT

A water-in-oil emulsion that includes an oil phase (O) and an aqueous phase (A) at an O/A ratio of from about 1:8 to about 10:1; wherein the water-in-oil emulsion includes the oil phase as a continuous phase that includes an inert hydrophobic liquid, at least one water-insoluble hydrophobic monomer, and at least one surfactant, and the aqueous phase as a dispersed phase of distinct particles in the oil phase that includes water and a water soluble polymer that includes: (i) at least one acrylamide monomer and (ii) at least one acrylic acid monomer; wherein the water soluble polymer is present in an amount from about 10 to about 35 weight percent of the water-in-oil emulsion. Also provided is water-in-oil emulsion that includes an oil phase (O) and an aqueous phase (A) at an O/A ratio of from about 1:8 to about 10:1; wherein the water-in-oil emulsion includes the oil phase as a continuous phase that includes an inert hydrophobic liquid and at least one surfactant, and the aqueous phase as a dispersed phase of distinct particles in the oil phase that includes water and a water soluble polymer that includes: (i) at least one acrylamide monomer, (ii) at least one acrylic acid monomer, and (iii) at least one water soluble hydrophobic monomer; wherein the water soluble polymer is present in an amount from 10 to 35 weight percent of the water-in-oil emulsion. Methods of treating a portion of a subterranean formation with a water-in-oil emulsion are also provided.

6 Claims, No Drawings

VISCOSIFYING FRICTION REDUCERS

CROSS-REFERENCE TO RELATED APPLICATIONS

This application is a continuation of U.S. patent application Ser. No. 15/050,824, filed Feb. 23, 2016, which claims the benefit of United States Provisional Application No. 62/126,170, filed Feb. 27, 2015. The disclosures of both of which are herein incorporated by reference in their entireties.

BACKGROUND

The disclosed subject matter relates to compositions for treating subterranean zones. The compositions include aqueous subterranean treatment fluids that contain water soluble polymers in a water-in-oil emulsion and associated methods.

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

Viscous gelled fracturing fluids are commonly utilized in the hydraulic fracturing of subterranean zones penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The friction reducing polymer should reduce the frictional losses due to friction between the aqueous treatment fluid in turbulent flow and the tubular goods and/or the formation.

There is an ongoing need to develop treatment solutions that have effective friction reduction to minimize energy loss but yet have sufficient viscosity for proppant-carrying capacity, while being safe and environmentally friendly.

SUMMARY

The present disclosure provides a water-in-oil emulsion that includes an oil phase (O) and an aqueous phase (A) at an O/A ratio of from about 1:8 to about 10:1; wherein the water-in-oil emulsion includes the oil phase as a continuous phase that includes an inert hydrophobic liquid, at least one water-insoluble hydrophobic monomer, and at least one surfactant, and the aqueous phase as a dispersed phase of distinct particles in the oil phase that includes water and a water soluble polymer that includes: (i) at least one acrylamide monomer and (ii) at least one acrylic acid monomer; wherein the water soluble polymer is present in an amount from about 10 to about 35 weight percent of the water-in-oil emulsion.

Also provided is water-in-oil emulsion that includes an oil phase (O) and an aqueous phase (A) at an O/A ratio of from about 1:8 to about 10:1; wherein the water-in-oil emulsion includes the oil phase as a continuous phase that includes an inert hydrophobic liquid and at least one surfactant, and the aqueous phase as a dispersed phase of distinct particles in the oil phase that includes water and a water soluble polymer that includes: (i) at least one acrylamide monomer, (ii) at least one acrylic acid monomer, and (iii) at least one water soluble hydrophobic monomer; wherein the water soluble polymer is present in an amount from 10 to 35 weight percent of the water-in-oil emulsion.

Also provided is method of treating a portion of a subterranean formation, that includes the steps of providing a water-in-oil emulsion; inverting the water-in-oil emulsion by adding it to water at from about 0.1 to about 3 gallons of water-in-oil emulsion per thousand gallons of water to form a friction reducing treatment solution containing from about 0.0025 to less than about 0.1% water-soluble polymer based on the weight of the treatment solution; and introducing the treatment solution into the portion of the subterranean formation.

Also provided is a method of treating a portion of a subterranean formation, that includes the steps of: providing a water-in-oil emulsion; inverting the water-in-oil emulsion by adding it to water at from about 0.1 to about 3 gallons of water-in-oil emulsion per thousand gallons of water to form a friction reducing treatment solution containing from about 0.0025 to less than about 0.1% water-soluble polymer based on the weight of the treatment solution; and introducing the treatment solution into the portion of the subterranean formation.

DETAILED DESCRIPTION

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass oligomer, and includes, without limitation, both homopolymers and copolymers.

As used herein, the term "copolymer," as used herein, is not limited to polymers containing two types of monomeric units, but includes any combination of polymers, e.g., terpolymers, tetrapolymers, and the like.

It has now been discovered that hydrophobic modification of inverse-emulsion friction reducers increases the viscosity of the solution after inversion. Such fluids are advantageous because they provide friction reduction in combination with high viscosity necessary to facilitate the transportation of proppant.

The present invention provides a method of treating a portion of a subterranean formation that includes: providing a water-in-oil emulsion, inverting the water-in-oil emulsion to provide an aqueous treatment fluid that includes a polymer solution with at least one hydrophobic monomer, and introducing the aqueous treatment fluid into the portion of the subterranean formation.

The aqueous friction reducing treatment solutions of the present disclosure generally include water, a friction reducing copolymer, and at least one hydrophobic monomer.

The water-in-oil emulsion includes an oil phase, an aqueous phase, at least one surfactant, and at least one hydrophobic monomer. The hydrophobic monomer(s) can be present in the oil phase and/or the aqueous phase. For example, when used, water-insoluble hydrophobic monomer(s) are typically present in the oil phase. Alternatively, when water-soluble hydrophobic monomer(s) are used, the one or more monomers are typically present in the aqueous phase. It is noted that water-insoluble monomers in the oil phase exist in dynamic equilibrium with water-soluble monomers in the aqueous phase, especially under strong stirring conditions. For example, water-insoluble monomers in the oil phase will polymerize with the water-soluble polymer in the aqueous phase; which is evidenced by the enhanced viscosity listed in Table 1 for Emulsions D and E (water-insoluble monomers).

Non-limiting examples for the water-insoluble hydrophobic monomer(s) include $C_8$-$C_{18}$ acrylates. Non-limiting examples for $C_8$-$C_{18}$ acrylates include 2-ethyl hexylacrylate; lauryl acrylate; octyl acrylate; and octadecyl acrylate.

Non-limiting examples for the water-soluble hydrophobic monomer(s) include methacrylic ester monomers. Non-limiting examples for methacrylic ester monomers include the active ingredients in Sipomer® HPM-300 and Sipomer® HPM-400.

The hydrophobic monomer(s) are present in any suitable amount. In an embodiment, the hydrophobic monomer(s) are present in an amount from about 0.05 to about 5.0 weight percent of the water-in-oil emulsion. In another embodiment, the hydrophobic monomer(s) are present in an amount from about 0.05 to about 1.0 weight percent of the water-in-oil emulsion.

The oil phase (O) and the aqueous phase (A) can be present at an O/A ratio, based on the volume of each phase of from at least about 1:8, in some cases at least about 1:6 and in other cases at least about 1:4 and can be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio can be any ratio or range between any of the ratios recited above.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobil Corporation, Irving Tex., a narrow fraction of a branch-chain hydrocarbon available as KENSOL® 61 from Witco Chemical Company, New York, N.Y., mineral oil, available commercially as BLANDOL® from Witco, CALUMET™ LVP-100 available from Calumet Specialty Products, Burnham, Ill., DRAKEOL® from Penreco Partnership, Houston, Tex., MAGIESOL® from Magie Bros., Oil City, Pa. and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 15% to about 80% by weight.

In embodiments of the disclosure, the inert hydrophobic liquid is present in the water-in-oil emulsion at a level of at least about 15, in some cases at least about 17.5, in other cases at least about 20, and in some instances at least about 22.5 weight percent based on the weight of the water-in-oil emulsion and can be present at up to about 40, in some cases up to about 35, in other cases up to about 32.5 and in some instances up to about 30 weight percent based on the weight of the water-in-oil emulsion. The total amount of inert hydrophobic liquid in the water-in-oil emulsion can be any value or can range between any of the values recited above.

Any suitable water-in-oil emulsifier can be used as the one or more surfactants used to make the water soluble polymer containing water-in-oil emulsion used in the present method. In embodiments of the disclosure, the surfactants include those having an HLB (hydrophilic-lipophilic balance) value between 2 and 10 in some cases between 3 and 9 and in other cases between 3 and 7.

As used herein, HLB is calculated using the art known method of calculating a value based on the chemical groups of the molecule. The method uses the following equation:

$$HLB = 7 + m*Hh + n*Hl$$

where m represents the number of hydrophilic groups in the molecule, Hh represents the value of the hydrophilic groups, n represents the number of lipophilic groups in the molecule and Hl represents the value of the lipophilic groups.

Non-limiting examples of suitable surfactants include:
fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol;
fatty acid esters of sorbitan, for instance sorbitan monoleate, sorbitan dioleate, sorbitan trioleate, sorbitan monostearate and sorbitan tristearate;
fatty acid esters of mannitol, for instance mannitol monolaurate or mannitol monopalmitate;
fatty acid esters of pentaerythritol, for instance pentaerythritol monomyristate, pentaerythritol monopalmitate and pentaerythritol dipalmitate;
fatty acid esters of polyethylene glycol sorbitan, more particularly the monooleates;
fatty acid esters of polyethylene glycol mannitol, more particularly the monooleates and trioleates;
fatty acid esters of glucose, for instance glucose monooleate and glucose monostearate;
trimethylolpropane distearate;
the products of reaction of isopropylamide with oleic acid;
fatty acid esters of glycerol sorbitan;
ethoxylated alkylaines;
sodium hexadecyl phthalate;
sodium decyl phthalate; and
oil-soluble alkanolamides.

In particular embodiments of the disclosure, the surfactants can include ethoxylated nonionic surfactants, guerbet alcohol ethoxylate, and mixtures thereof. Specific examples include, but are not limited to tall oil fatty acid diethanolamine, such as those available as AMADOL® 511, from Akzo Nobel Surface Chemistry, Chicago, Ill.; polyoxyethylene (5) sorbitan monoleate, available as TWEEN® 81, from Uniqema, New Castle, Del.; sorbinate monoleate, available as SPAN® 80 from Uniquena, and ALKAMULS® SMO, from Rhone Poulenc, Inc., Paris, France.

The surfactants can be present at a level of at least about 0.1, in some instances at least about 0.25, in other instances at least about 0.5, in some cases at least about 0.75 and in other cases at least about 1 weight percent of the water-in-oil emulsion. When the amount of surfactants is too low, the aqueous phase may not be adequately dispersed in the oil phase and/or the water-in-oil emulsion may tend to separate into oil and aqueous phases. Also, the amount of surfactants can be up to about 7, in some cases up to about 5, and in other cases up to about 2.5 weight percent of the water-in-oil emulsion. The amount of surfactants in the water-in-oil emulsion can be any value or can range between any of the values recited above.

The aqueous phase is a dispersed phase of distinct particles in the oil phase and includes water and a water soluble polymer. The aqueous phase in total can be present in the present water-in-oil emulsion polymer composition at a level of at least about 60, in some instances at least about 65, in some cases at least about 67.5, and in other cases at least about 70 weight percent based on the weight of the water-in-oil emulsion and can be present at up to about 85, in some cases up to about 82.5, in other cases up to about 80 and in some instances up to about 77.5 weight percent based on the weight of the water-in-oil emulsion. The total amount of aqueous phase in the water-in-oil emulsion can be any value or can range between any of the values recited above.

In the present disclosure, the water soluble polymer is present at a level of at least about 5, in some instances 10, in some cases at least about 15, and in other cases at least about 20 weight percent based on the weight of the water-in-oil emulsion and can be present at up to about 33, in some cases up to about 35, in other cases up to about 37 and in some instances up to about 40 weight percent based on the weight of the water-in-oil emulsion. When the amount of water soluble polymer is too low, the use of the water-in-oil emulsion in the present method of treating a portion of a subterranean formation may be uneconomical. When the amount of water soluble polymer is too high, the performance of the water soluble polymer in the present method of treating a portion of a subterranean formation may be less than optimal. The amount of water soluble polymer in the aqueous phase of the water-in-oil emulsion can be any value or can range between any of the values recited above.

The water soluble polymer in the water-in-oil emulsion is prepared by polymerizing a monomer solution that includes at least one (meth)acrylamide monomer and at least one (meth)acrylic acid monomer containing monomers included at a level that provides the desired amount of water soluble polymer.

The monomer mixture typically includes (meth)acrylamide. The amount of (meth)acrylamide can be at least about 50, in some cases at least about 60, and in other cases at least about 70 weight percent based on the weight of the monomer mixture. When the amount of (meth)acrylamide is too low, the molecular weight of the resulting water soluble polymer may be lower than desired. Also, the amount of (meth)acrylamide in the monomer mixture can be up to about 90, in some case up to about 85, and in other cases up to about 80 weight percent based on the weight of the monomer mixture. When the amount of (meth)acrylamide is too high, the water soluble polymer may not carry enough ionic charge to optimally function as a friction reducing polymer. The amount of (meth)acrylamide in the monomer mixture can be any value or range between any of the values recited above.

The monomer mixture typically includes (meth)acrylic acid and/or its corresponding salts, non-limiting examples being sodium, potassium and ammonium. The amount of (meth)acrylic acid can be at least about 10, in some cases at least about 12, and in other cases at least about 14 weight percent based on the weight of the monomer mixture. When the amount of (meth)acrylic acid is too low, the water soluble polymer may not carry enough ionic charge to optimally function as a friction reducing polymer. Also, the amount of (meth)acrylic acid in the monomer mixture can be up to about 40, in some case up to about 18, and in other cases up to about 16 weight percent based on the weight of the monomer mixture. When the amount of (meth)acrylic acid is too high, the water soluble polymer may have undesirable flocculation properties when used in the present method. The amount of (meth)acrylic acid in the monomer mixture can be any value or range between any of the values recited above.

Optionally, the water soluble polymer can include other monomers to provide desirable properties to the polymer. Non-limiting examples of suitable other monomers that can be included in the monomer mixture, and ultimately the resulting water soluble polymer include 2-acrylamido-2-methylpropane sulfonic acid (AMPS) and acryloyloxyethyl trimethyl ammonium chloride (AETAC).

In certain embodiments of the invention, polymerized residues of AMPS can be present in the monomer mixture of the present invention in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 70% to about 85% by weight, acrylic acid in an amount in the range of from about 10% to about 12.5% by weight, and 2-acrylamido-2-methylpropane sulfonic acid in an amount in the range of from about 2.5% to about 20% by weight of the monomer mixture.

Typically, the composition of the water soluble polymer will be the same or about the same as the composition of the monomer mixture.

The water-in-oil emulsion of the present disclosure can be made down into a 0.3 wt % aqueous solution of the inverted water-in-oil emulsion. Thus, the water soluble polymers in the dispersed aqueous phase particles of the present water-in-oil emulsion are able to provide a greater friction reducing effect by reducing the energy losses due to friction in the aqueous treatment fluids of the present disclosure. As a non-limiting example, the water soluble polymers of the present disclosure can reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

The water-in-oil emulsion containing the water soluble polymer of the present method is prepared using water-in-oil emulsion polymerization techniques. Suitable methods to effect such polymerizations are known in the art, non-limiting examples of such being disclosed in U.S. Pat. Nos. 3,284,393; 4,024,097; 4,059,552; 4,419,344; 4,713,431; 4,772,659; 4,672,090; 5,292,800; and 6,825,301, the relevant disclosures of which are incorporated herein by reference.

Typically, the water-in-oil polymerization is carried out by mixing the surfactants with the oil phase, which contains the inert hydrophobic liquid. The aqueous phase is then prepared combining a monomer mixture with water in the desired concentration. Additionally, a chelant, such as a sodium salt of EDTA can optionally be added to the aqueous phase and the pH of the aqueous phase can be adjusted to 3.0 to 10.0, depending on the particular monomer(s) in the monomer mixture. The aqueous phase is then added to the mixture of oil phase and surfactants. The surfactants enable the aqueous phase, which contains the monomer mixture, to be emulsified into and form discrete particles in the oil phase. Polymerization is then carried out in the presence of a free radical generating initiator.

Any suitable initiator can be used. Non-limiting examples of suitable initiators include diethyl 2,2'-azobisisobutyrate, dimethyl 2,2'-azobisisobutyrate, 2-methyl 2'-ethyl azobisisobutyrate, benzoyl peroxide, lauroyl peroxide, sodium persulfate, potassium persulfate, tert-butyl hydroperoxide, dimethane sulfonyl peroxide, ammonium persulfate, azobisisobutylronitrile, dimethyl 2,2'-azobis (isobutyrate) and combinations thereof.

The amount of initiator can be from about 0.01 to 1% by weight of the monomer mixture, in some cases from 0.02% to 0.5% by weight of the monomer mixture.

In some embodiments of the disclosed subject matter, the polymerization technique may have an initiation temperature of about 25° C. and proceed approximately adiabatically. In other embodiments of the disclosure, the polymerization can be carried out isothermally at a temperature of about from 37° C. to about 50° C.

In some embodiments, the oil-in-water emulsion can include a salt. Among other things, the salt can be present to add stability to the emulsion and/or reduced viscosity of the emulsion. Examples of suitable salts, include, but are not limited to, ammonium chloride, potassium chloride, sodium chloride, ammonium sulfate, and mixtures thereof. In some embodiments, the salt can be present in emulsions in an amount in the range of from about 0.5% to about 2.5% by weight of the emulsion.

In some embodiments, the oil-in-water emulsions can include an inhibitor. Among other things, the inhibitor can be included to prevent premature polymerization of the monomers prior to initiation of the emulsion polymerization reaction. As those of ordinary skill in the art will appreciate, with the benefit of this disclosure, the water soluble polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

The water soluble polymers of the disclosed subject matter typically have a molecular weight sufficient to provide a desired level of friction reduction. Generally, friction reducing polymers have a higher molecular weight in order to provide a desirable level of friction reduction. As a non-limiting example, the weight average molecular weight of the friction reducing copolymers may be in the range of from about 2,000,000 to about 20,000,000, in some cases up to about 30,000,000, as determined using intrinsic viscosities. Those of ordinary skill in the art will recognize that friction reducing copolymers having molecular weights outside the listed range may still provide some degree of friction reduction in an aqueous treatment fluid.

The water-in-oil emulsion is added to water by inverting the emulsion to form a friction reducing treatment solution. As used herein, the terms "invert" and/or "inverting" refer to exposing the water-in-oil emulsion to conditions that cause the aqueous phase to become the continuous phase. This inversion releases the water soluble polymer into the make-up water.

Methods of inverting water soluble polymer containing water-in-oil emulsions are known in the art and are disclosed, as a non-limiting example in U.S. Pat. No. 3,624,019 which is incorporated herein by reference.

In embodiments of the disclosed subject matter, in order to aid the inversion, make down and dissolution of the water soluble polymer, an inverting surfactant can be included in the water-in-oil emulsion. Among other things, the inverting surfactant can facilitate the inverting of the emulsion upon addition to make up water and/or the aqueous treatment fluids of the disclosed subject matter. As those of ordinary skill in the art will appreciate, with the benefit of this disclosure, upon addition to the aqueous treatment fluid, the water-in-oil emulsion should invert, releasing the copolymer into the aqueous treatment fluid.

Non-limiting examples of suitable inverting surfactants include, polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, and sorbitol-anhydride).

In particular embodiments of the disclosed subject matter, the inverting surfactants can include ethoxylated nonyl phenols, ethoxylated nonyl phenol formaldehyde resins, ethoxylated alcohols, nonionic surfactants with an HLB of from 12 to 14, and mixtures thereof.

A specific non-limiting example of a suitable inverting surfactant includes an ethoxylated $C_{12}$-$C_{16}$ alcohol. In some aspects of the disclosed subject matter, the inverting surfactant can be a $C_{12}$-$C_{14}$ alcohol having 5 to 10 units of ethoxylation. The inverting surfactant can be present in an amount sufficient to provide the desired inversion of the emulsion upon contact with the water in the aqueous treatment fluid. In some embodiments, the inverting surfactant can be present in an amount in the range of from about 1%, in some cases about 1.1%, in other cases about 1.25% and can be up to about 5%, in some cases about 4%, in other cases about 3%, in some instances about 2% and in other instances about 1.75% by weight of the water-in-oil emulsion.

In many embodiments of the disclosed subject matter, the inverting surfactants are added to the water-in-oil emulsion after the polymerization is completed.

In some embodiments of the disclosed subject matter, a batch method can be used to make down the water-in-oil emulsion. In this embodiment, the water soluble polymer containing water-in-oil emulsion and water are delivered to a common mixing tank. Once in the tank, the solution is beat or mixed for a specific length of time in order to impart energy thereto. After mixing, the resulting solution must age to allow enough time for the molecules to unwind. This period of time is significantly reduced in the present disclosure.

In some embodiments, continuous in-line mixers as well as in-line static mixers can be used to combine the water soluble polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150, which are incorporated herein by reference. Non-limiting examples of suitable static mixers can be found in U.S. Pat. Nos. 4,051,065 and 3,067,987, which are incorporated herein by reference.

Once the water soluble polymer containing water-in-oil emulsion is made down into water, any other additives are added to the solution to form a treatment solution, which is then introduced into the portion of the subterranean formation.

Generally, the water soluble polymer can be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids of the disclosed subject matter can be freshwater, saltwater (e.g., water containing one or more salts dissolved therein), brine (e.g., produced from subterranean formations), seawater, pit water, pond water—or—the like, or combinations thereof. Generally, the water used may be from any source, provided that it does not contain an excess of compounds that may adversely affect other components in the aqueous treatment fluid or the formation itself. The disclosed subject matter is effective in all aqueous treating fluid waters.

The water soluble polymers of the present disclosure should be included in the aqueous treatment fluids of the present disclosure in an amount sufficient to provide the desired reduction of friction. In some embodiments, a water soluble polymer of the present disclosure may be present in an amount that is at least about 0.0025%, in some cases at least about 0.003%, in other cases at least about 0.0035% and in some instances at least about 0.05% by weight of the aqueous treatment fluid and can be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids can be any value or range between any of the values recited above.

In some embodiments, the water soluble polymer can be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In some embodiments when the present water-in-oil emulsions are used, the amount of water soluble polymer in the aqueous treatment fluid can be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

In embodiments of the disclosure, the water-in-oil emulsions according to the disclosure are used in the friction reducing treatment solution in an amount of at least about 0.1 gallons of water-in-oil emulsion per thousand gallons of aqueous treating fluid water (gpt), in some cases at least about 0.15 gpt, and in other cases at least about 0.2 gpt and can be up to about 3 gpt, in some cases up to about 2.5 gpt, in other cases up to about 2.0 gpt, in some instances up to about 1.5 gpt, and in other instances up to about 1.5 gpt. The amount of water-in-oil emulsion used in the friction reducing treatment solution can be any value or range between any of the values recited above.

In embodiments of the disclosed subject matter, the aqueous treatment fluid contains 10,000 to 300,000 ppm of total dissolved solids. In some embodiments, the total dissolved solids include at least 10 weight percent of a multivalent cation. In many embodiments, the any multivalent cation can be included and can include one or more selected from iron (in its ferrous and ferric forms), calcium, magnesium, manganese, strontium, barium, and zinc.

In embodiments of the present disclosure, the aqueous treatment fluid can include total dissolved solids at a level of at least about 100 ppm, in some instances at least about 500 ppm, in other instances at least about 1,000 ppm, in some cases at least about 5,000 ppm and in other cases at least about 10,000 ppm and can be up to about 500,000 ppm, in certain cases up to about 400,000 ppm, in many cases up to about 300,000 ppm, in some cases up to about 250,000 ppm, in other cases up to about 200,000 ppm, in some instances up to about 100,000 ppm, in other instances up to about 50,000 ppm and in some situations up to about 25,000 ppm. The amount of total dissolved solids in the aqueous treatment solution can be any value or range between any of the values recited above.

The lower polymer usage when the present invention is used results in significantly decreased formation damage, decreased flocculation in above ground fluid recycle operations, and is more environmentally friendly as lower levels of polymer are used. Additionally, the lower polymer dose can be delivered using existing equipment resulting in better performance with little or no capital cost requirement.

Additional additives can be included in the aqueous treatment fluids of the present disclosure as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

The aqueous treatment fluids of the present disclosure can be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the disclosed subject matter includes a method of treating a portion of a subterranean formation that includes providing the above-described aqueous treatment fluid and introducing the aqueous treatment fluid into the portion of the subterranean formation. In some embodiments, the aqueous treatment fluid can be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present disclosure can also include preparing the aqueous treatment fluid. Preparing the aqueous treatment fluid can include providing the water soluble polymer containing water-in-oil emulsion and combining the water soluble polymer with the water to from the aqueous treatment fluid.

The present disclosure will further be described by reference to the following examples. The following examples are merely illustrative and are not intended to be limiting. Unless otherwise indicated, all percentages are by weight.

Example 1

Preparation of Hydrophobically Modified Water-in-Oil Emulsion Polymer

Table 1 presents the ingredients (expressed in weight percent of total composition) in the aqueous monomer phase, oil phase and surfactants for water-in-oil emulsion synthesis. Typical preparation included the mixing of water, acrylamide, acrylic acid, hydroquinone monomethyl ether (MEHQ), ethylene diamine tetra acetic acid (EDTA), water-soluble hydrophobic monomer(s) and 25% sodium hydroxide until all dissolved to form uniform aqueous phase. The oil phase consists of well-mixed hydrophobic liquid, water-insoluble hydrophobic monomer and indicated surfactants. The aqueous phase was then added to the oil phase with mixing to form dispersion of the aqueous phase dispersed in the continuous oil phase. The dispersion was purged with nitrogen while being heated to an initiation temperature of about 28 degrees C. and then a water soluble free radical initiator was added to initiate the polymerization. Typically, the oil phase was first added to a glass resin kettle and once the agitation was on, the aqueous phase was added to the kettle. The dispersion was purged with nitrogen for 30 minutes while being heated and stabilized at 28 degrees C., at which time 19 microliters of peroxide was added to the agitated dispersion and 0.05% sodium metabisulfate (SMBS) was fed into the resin kettle at a rate of 0.1 ml per minute. The polymerization temperature was maintained between 48 to 52 degrees C. for about 90 minutes. Residual monomers were scavenged using concentrated SMBS with a feeding rate of 1 ml per minutes for 10 minutes. Appropriate amount of inverting surfactant was then slowly added to the water-in-oil emulsion to aid the make-down upon use. The emulsions shown in Table 1 include a water soluble polymer containing acrylamide/acrylic acid in a weight ratio of 70/30 along with 0.1 wt % to 1 wt % of the hydrophobic monomers.

TABLE 1

| | Emulsion A | Emulsion B | Emulsion C | Emulsion D | Emulsion E |
|---|---|---|---|---|---|
| Active Polymer Aqueous Phase: | 35% | 35% | 35% | 35% | 35% |
| 50 wt % Acrylamide | 45.00% | 45.00% | 45.00% | 45.00% | 45.00% |

TABLE 1-continued

| | Emulsion A | Emulsion B | Emulsion C | Emulsion D | Emulsion E |
|---|---|---|---|---|---|
| Acrylic acid | 9.63% | 9.63% | 9.63% | 9.63% | 9.63% |
| 25% NaOH (to pH 6.5) | 17.82% | 17.82% | 17.82% | 17.82% | 17.82% |
| D.I water | 2.32% | 2.22% | 2.12% | 1.22% | 2.12% |
| EDTA | 0.02% | 0.02% | 0.02% | 0.02% | 0.02% |
| MEHQ | 0.01% | 0.01% | 0.01% | 0.01% | 0.01% |
| Sipomer HPM-300* | 0.00% | 0.10% | 0.00% | 0.00% | 0.00% |
| Sipomer HPM-400* | 0.00% | 0.00% | 0.20% | 0.00% | 0.00% |
| Oil Phase: | | | | | |
| Aliphatic Hydrocarbon | 16.75% | 16.75% | 16.75% | 16.75% | 16.75% |
| 2-Ethyl hexylacrylate | 0.00% | 0.00% | 0.00% | 1.00% | 0.00% |
| Octadecyl acrylate | 0.00% | 0.00% | 0.00% | 0.00% | 0.20% |
| Primary Surfactants: | | | | | |
| Sorbitane monooleate | 0.20% | 0.20% | 0.20% | 0.20% | 0.20% |
| Polyoxyethylene sorbitan monooleate | 0.31% | 0.31% | 0.31% | 0.31% | 0.31% |
| Oleamide diethanolamine | 1.50% | 1.50% | 1.50% | 1.50% | 1.50% |
| Initiator: | | | | | |
| SMBS solution (0.05%) | 1.32% | 1.32% | 1.32% | 1.32% | 1.32% |
| Peroxide | 0.002% | 0.002% | 0.002% | 0.002% | 0.002% |
| Inverting Surfactant: | | | | | |
| Ethoxylated Alcohol | 0.99% | 0.99% | 0.99% | 0.99% | 0.99% |
| Viscosity at 3 gpt in tap water at 22° C. | 17 cp | 21 cp | 19 cp | 19 cp | 28 cp |

*Percentages are based upon product as supplied, not active ingredient.

Viscosity Testing

The viscosities of the 3 gpt or 0.3% make-down solution of the friction reducers were measured by FANN 35 viscometer at 300 rpm. The data presented in the last row of Table 1 shows that the incorporation of hydrophobic monomers increased the viscosity of the make-down solution at 3 gpt. For example, the inclusion of 0.1% Sipomer HPM-300 increased the viscosity from 17 to 21 cp. Furthermore, addition of 0.2% octadecyl acrylate significantly boosted its 3 gpt visocisty to 28 cp, a surprising 65 percent increase compared to the base formulation (Emulsion A).

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition, e.g., the friction reduction performance or viscosity of the composition. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

We claim:

1. A method of treating a portion of a subterranean formation, comprising:
   providing a water-in-oil emulsion comprising an oil phase (O) and an aqueous phase (A) at an O/A ratio of from about 1:8 to about 10:1, wherein the water-in-oil emulsion includes: the oil phase as a continuous phase comprising an inert hydrophobic liquid and at least one surfactant, and the aqueous phase as a dispersed phase of distinct particles in the oil phase comprising water and a water soluble polymer comprising: (i) at least one acrylamide monomer, (ii) at least one acrylic acid monomer, and (iii) at least one water soluble hydrophobic monomer; wherein the water soluble polymer is present in an amount from 10 to 35 weight percent of the water-in-oil emulsion;
   inverting the water-in-oil emulsion by adding it to water at from about 0.1 to about 3 gallons of water-in-oil emulsion per thousand gallons of water to form a friction reducing treatment solution containing from about 0.0025 to less than about 0.1% water-soluble polymer based on the weight of the treatment solution; and
   introducing the treatment solution into the portion of the subterranean formation.

2. The method of claim 1, wherein the water-soluble hydrophobic monomer is selected from the group consisting of methacrylic ester monomers.

3. The method of claim 1, wherein the friction reducing treatment solution is introduced into the portion of the subterranean formation at a rate and pressure sufficient to create or enhance one or more fractures in the portion of the subterranean formation.

4. The method of claim 1, wherein the water-in-oil emulsion comprises at least one of an inhibitor, a salt, or an inverting surfactant.

5. The method of claim 1, wherein the water-in-oil emulsion is present in the friction reducing treatment solution in an amount in the range of from about 0.1 to about 3 gallons of water-in-oil emulsion per thousand gallons of 2% KCl solution (gpt).

6. The method of claim 1, further comprising: introducing the treatment solution into a wellbore through the subterranean formation.

* * * * *